United States Patent [19]
Oxley

[11] 3,788,411
[45] Jan. 29, 1974

[54] STRAINWEIGH BALANCE

[75] Inventor: Arthur R. Oxley, Battle Creek, Mich.

[73] Assignee: Franklin Electric Subsidiaries, Inc., Bluffton, Ind.

[22] Filed: Nov. 1, 1972

[21] Appl. No.: 302,760

[52] U.S. Cl............ 177/211, 177/210, 117/229, 177/226, 73/141 A
[51] Int. Cl. ............... G01g 1/12, G01g 23/26
[58] Field of Search... 177/210, 211, 246, 229, 226; 73/88.5 R, 141 A, 141 R, 141 AB

[56] References Cited
UNITED STATES PATENTS

| | | | |
|---|---|---|---|
| 2,796,503 | 6/1957 | Ward | 73/141 A |
| 3,135,112 | 6/1964 | Farley | 73/141 A |
| 3,495,669 | 2/1970 | Yeager et al. | 177/211 X |
| 3,656,569 | 4/1972 | Johnson | 177/211 |

*Primary Examiner*—Stephen J. Tomsky
*Assistant Examiner*—Vit W. Miska
*Attorney, Agent, or Firm*—Austin A. Webb

[57] ABSTRACT

A weighing beam from which signals proportional to, or comparative with, applied weights, by means of strain measuring gauges attached to the beam consists of a pair of plates each having one edge supported along a horizontal line in vertically spaced parallel relation to each other. The opposite unsupported edges of the plates are rigidly connected by a platform support member having a load receiving platform rigidly secured thereto. Each plate has a first inner line of two holes formed symmetrically therethrough in laterally spaced relation to its supported edge, and the thickness of the plates is reduced along a line through the holes to produce a central and two laterally spaced flexing areas. Each plate has a similar outer line of two holes formed therethrough parallel to the inner line and adjacent the outer edges of the plates and the thickness of the plates is reduced along the line of the outer holes to form similar central and laterally spaced flexing areas. Electrically responsive strain gauges are secured to the upper and lower sides of the central flexing area at the inner side of one of said plates, and are connectable to amplifying and measuring devices for recording or indicating the amount of strain in proportion to the applied load or weight on the beam.

16 Claims, 10 Drawing Figures

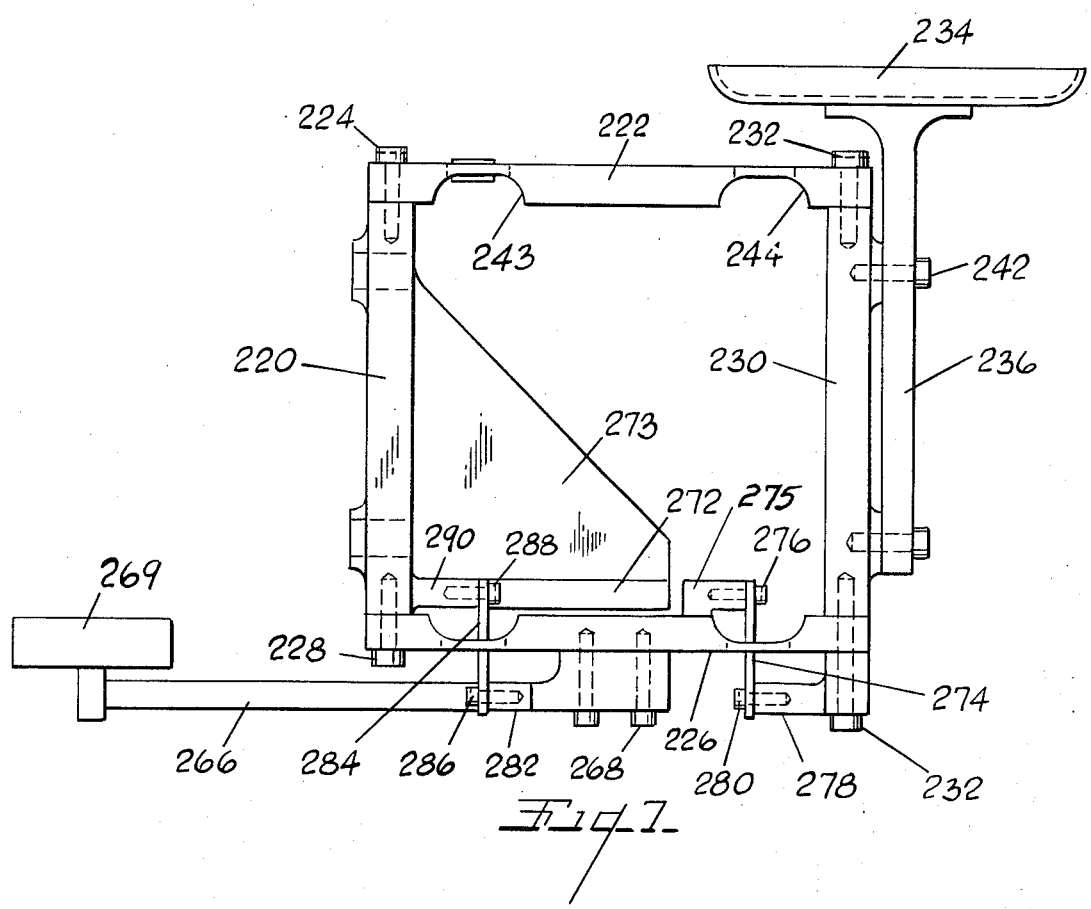
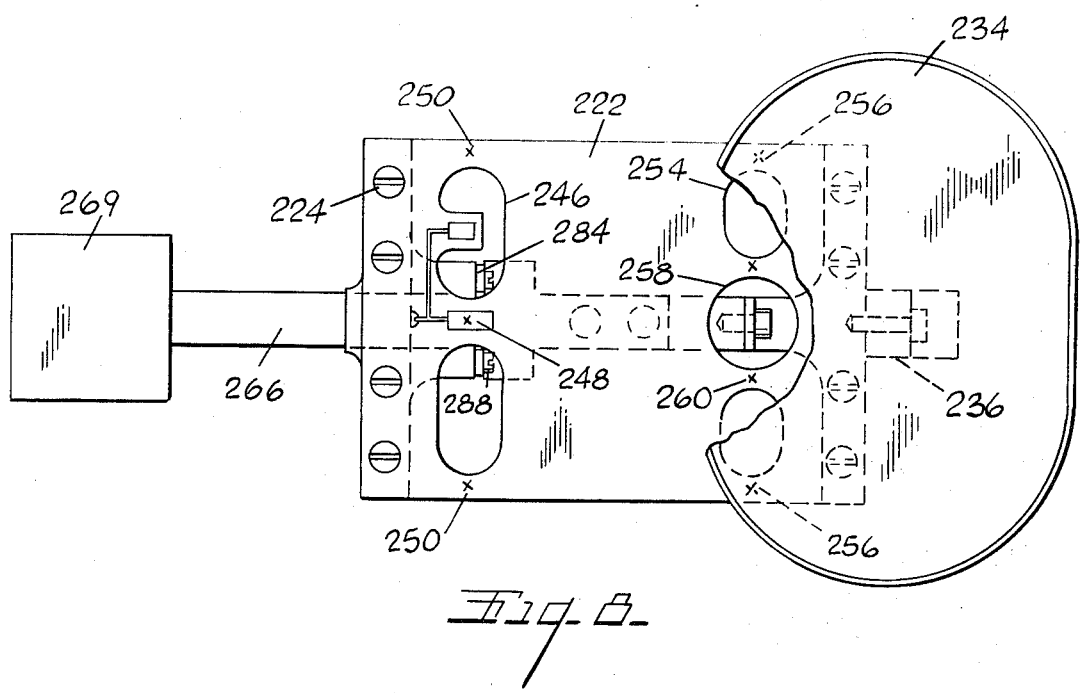

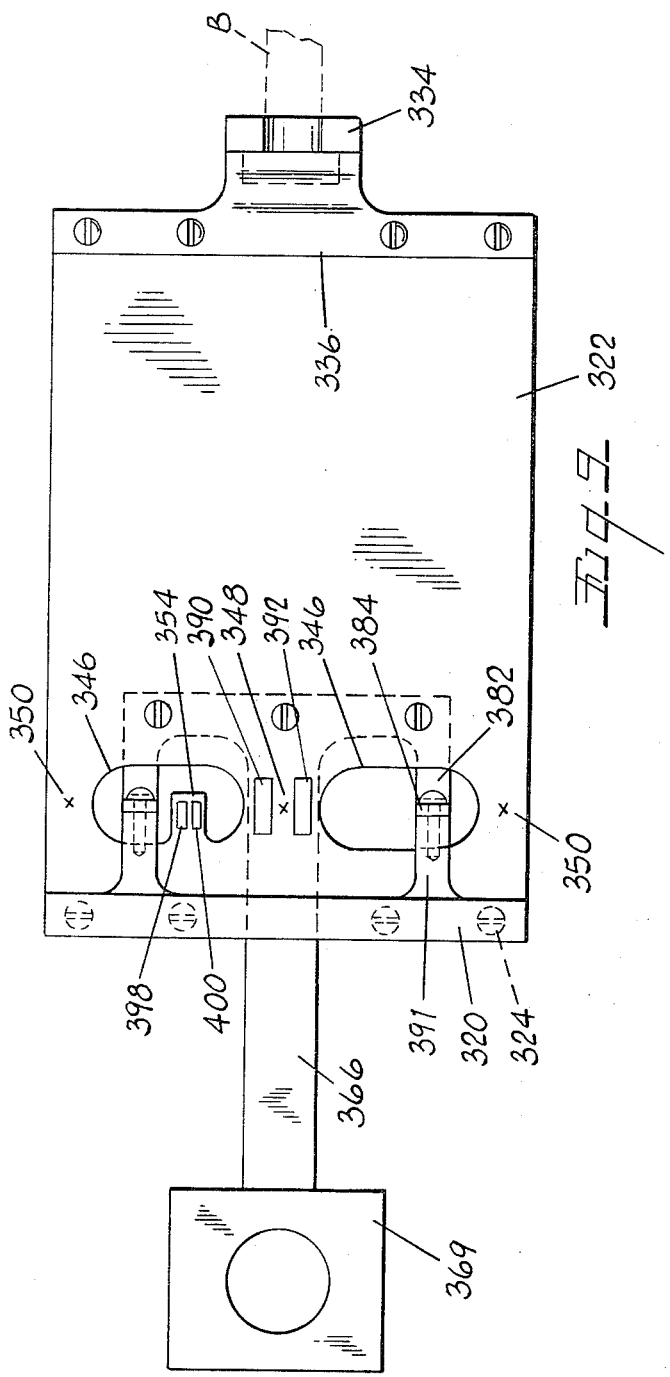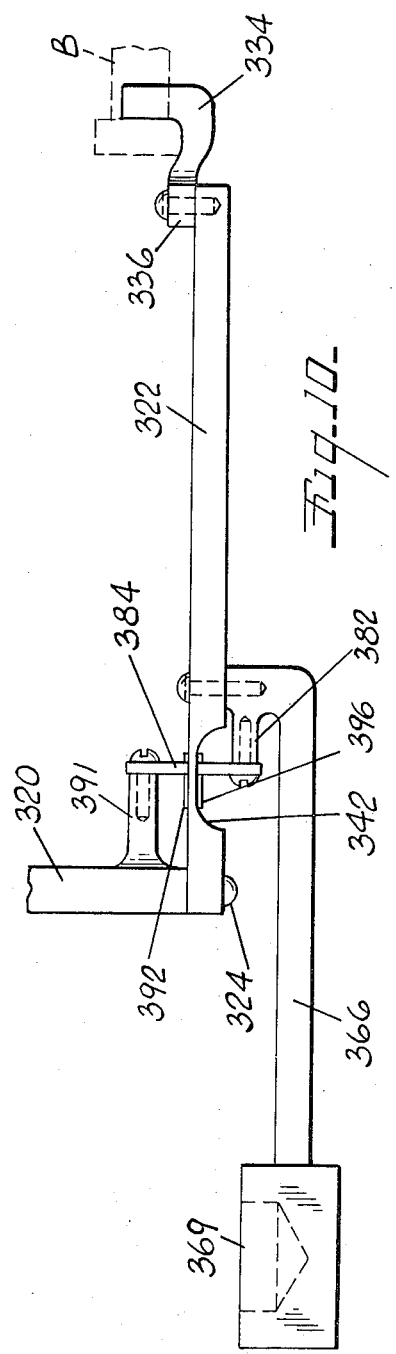

STRAINWEIGH BALANCE

As an added feature, temperature compensating elements are mounted on a tab projecting into one of said holes in one of the plates, and connected in series with the strain gauges.

Two forms of tare weight counterbalancing are disclosed. In one, a spring is connected between a fixed anchor or abutment and the platform support. The spring connections are adjusted to support the tare weight of the assembly near the neutral unstressed position and condition of the strain gauges. In another, counterbalancing arrangement, a counter-balance beam is rigidly connected to one of the plates between the lines of holes therein, and extended oppositely from the platform support to opposite side of the supported edges of the plates where a counter-weight is located.

OUTLINE OF INVENTION

The concept of weighing or comparing weights of masses connected to the free end of a flexible beam supported as a cantilever, by means of strain gauges applied to opposite sides of the beam to detect the amount of bending stress developed in the beam by an applied load is old. The present invention provides a weigh scale and beam system for utilizing this old concept in a way which neutralizes and cancels out errors and objectionable factors found in prior scales by eliminating or materially reducing the effects of torsion and off-center application of the load, vibration or oscillation developed in the scale by load application or operation of the structure associated with the scale, and by compensating for the effect of temperature on the parts of the scale.

The primary feature of the present scale is the provision of a weigh beam having at least two areas of localized flexing which are disposed on opposite sides of a third central area of localized flexing, all three flexing areas being arranged and disposed transversely and preferably symmetrically normal to the axis of bending of the beam. The strain gauges of the scale are applied to the opposite sides of the third central flexing area to sense the equal and opposite compression and tension stresses developed in the third central area by the application of a load to the beam.

A secondary feature of the scale is the provision of a mount for temperature compensating electrical resistance which is an integral part of the beam and responsive to changes in temperature of the beam where the strain gauges are mounted.

It is a further feature of the scale, in some of its forms, that movement of the scale is guided, limited and counterbalanced by localized bending areas that are rectangularly and quadrilaterally arranged in spaced relation to a central bending area, so that both the tare weight and eccentric position of the live load weight are absorbed and stabilized by compression and tension stresses that do not interfere with pure bending of the central control area and the stressing of the sensing gauges carried thereby, in accurate proportion to the applied load. This permits zeroing or balancing of the scale with the sensing gauges within their limits of straight linear response to the applied stresses of the load.

DESCRIPTION

The drawings, of which there are six sheets, illustrate three practical variations of the scale.

FIG. 7 is a side elevational view of a modified form of the scale, using a weight or mass counterbalance.

FIG. 8 is a top plan view of the scale in FIG. 7.

FIG. 9 is a top plan view of a further modified form of the scale.

FIG. 10 is a side elevational view of FIG. 9.

Figure 1:
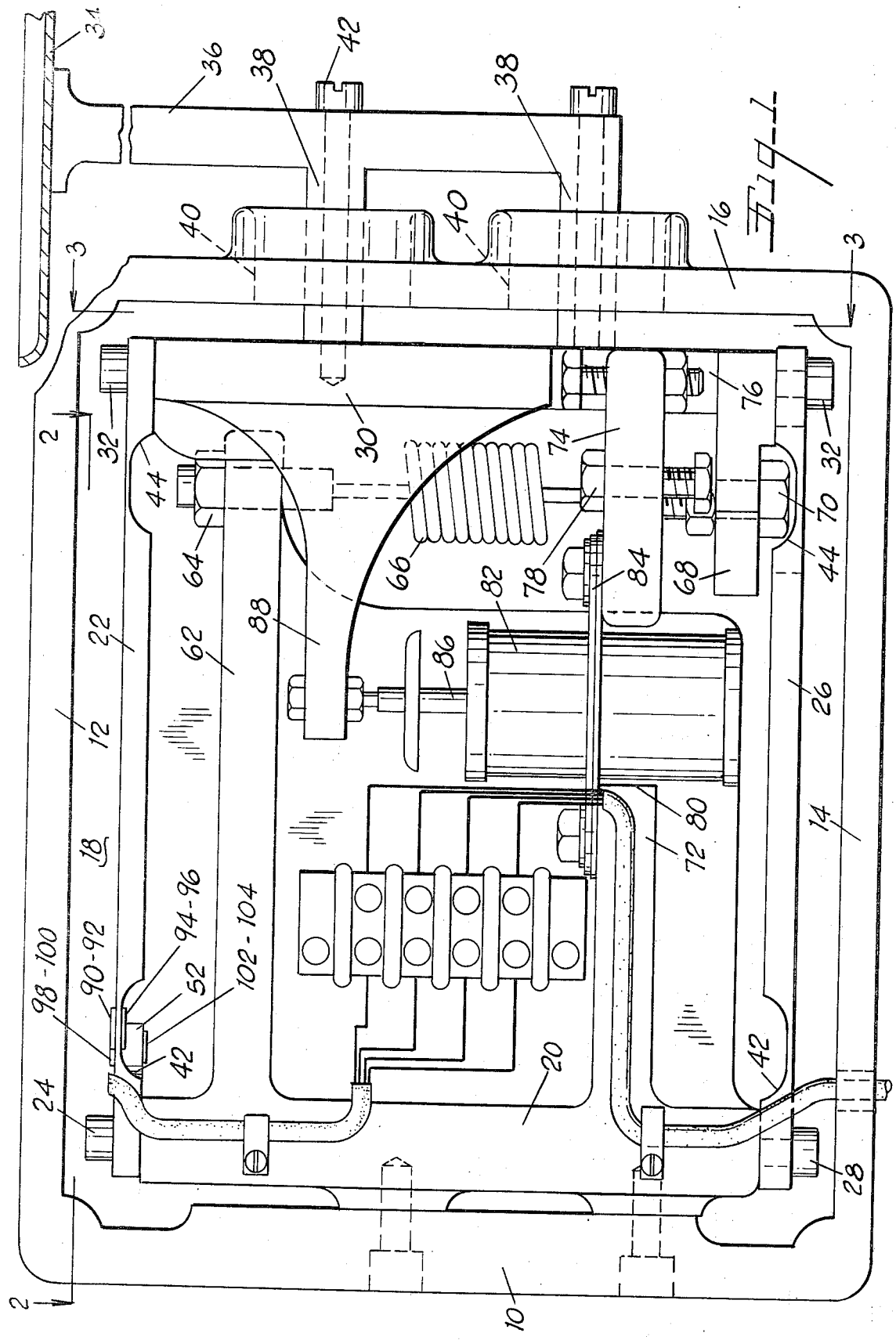
FIG. 1 is a side elevational view of a first form of the scale.

The example of the scale shown in FIGS. 1–6 consists of a housing having an upright inner wall 10, outwardly projecting top and bottom walls 12 and 14 connected to an outer wall 16, and a closure panel 18 along one side of the casing. The inner wall 10 rigidly supports an upright inner anchor plate 20 with exposed horizontal surfaces on its upper and lower edges. An upper plate-like beam 22 has its inner edge clamped to the top of the anchor plate by screws 24, and a lower plate-like anchor beam 26 is clamped to the lower edge of the anchor plate by screws 28. The outer, unsupported edges of beam plates are fixedly connected to an upright platform support plate 30 by screws 32. The platform 34 is carried on a column 36 from which arms 38 project inwardly through holes 40 in the housing wall 16 and are secured to the plate 30 by screws 42.

The beam plates 22 and 26 are similar but inverted opposites, and each has an inner area of reduced cross section formed by machining away a transverse portion of its thickness as at 42 (See FIG. 1). A parallel area of reduced cross section is formed near the outer edge of each plate as at 44. The inner areas of reduced cross section are further reduced by two oval shaped holes or openings 46 which leave central bending areas 48 and spaced edge bending areas 50. An integral tongue 52 is left projecting into one of the oval openings for a purpose to be described presently. The outer areas of reduced cross section are also further reduced by oval openings 54 which leave edge bending areas 56. Central holes 58 between the holes 54 divide the outer portions of the plates into two central bending areas 60.

It should be understood that the formation of the bending areas by means of machining areas of reduced thickness in the beam plates is an example only. Similar results can be obtained by stamping, flanging or ribbing sheets of flexible material, or even by casting.

It will thus be seen that the pan 34, together with the other unsupported tare weight elements of the system, and the load to be weighed, are supported by a parallelogram of flexing areas 48, 50, 56 and 60. The several bending areas are quadrilaterally or three dimensionally arranged along four rectangularly arranged and spaced parallel lines. The load on the scale is supported vertically by bending forces in the several bending areas, and counterbalancing and dampening structure to be described.

Figure 2:
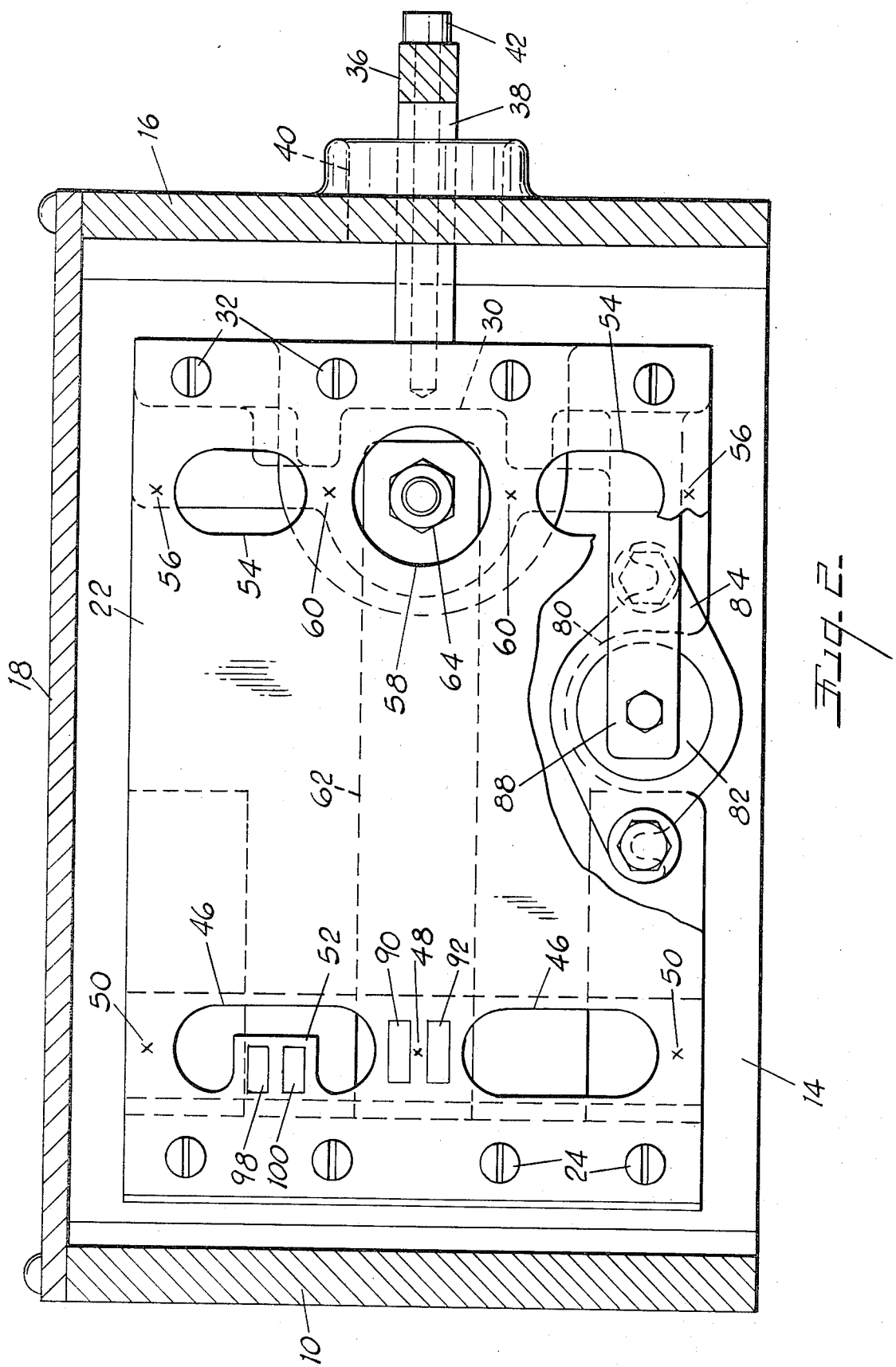
FIG. 2 is a horizontal cross sectional view along the line 2—2 in FIG. 1, with parts broken away.
Figure 3:
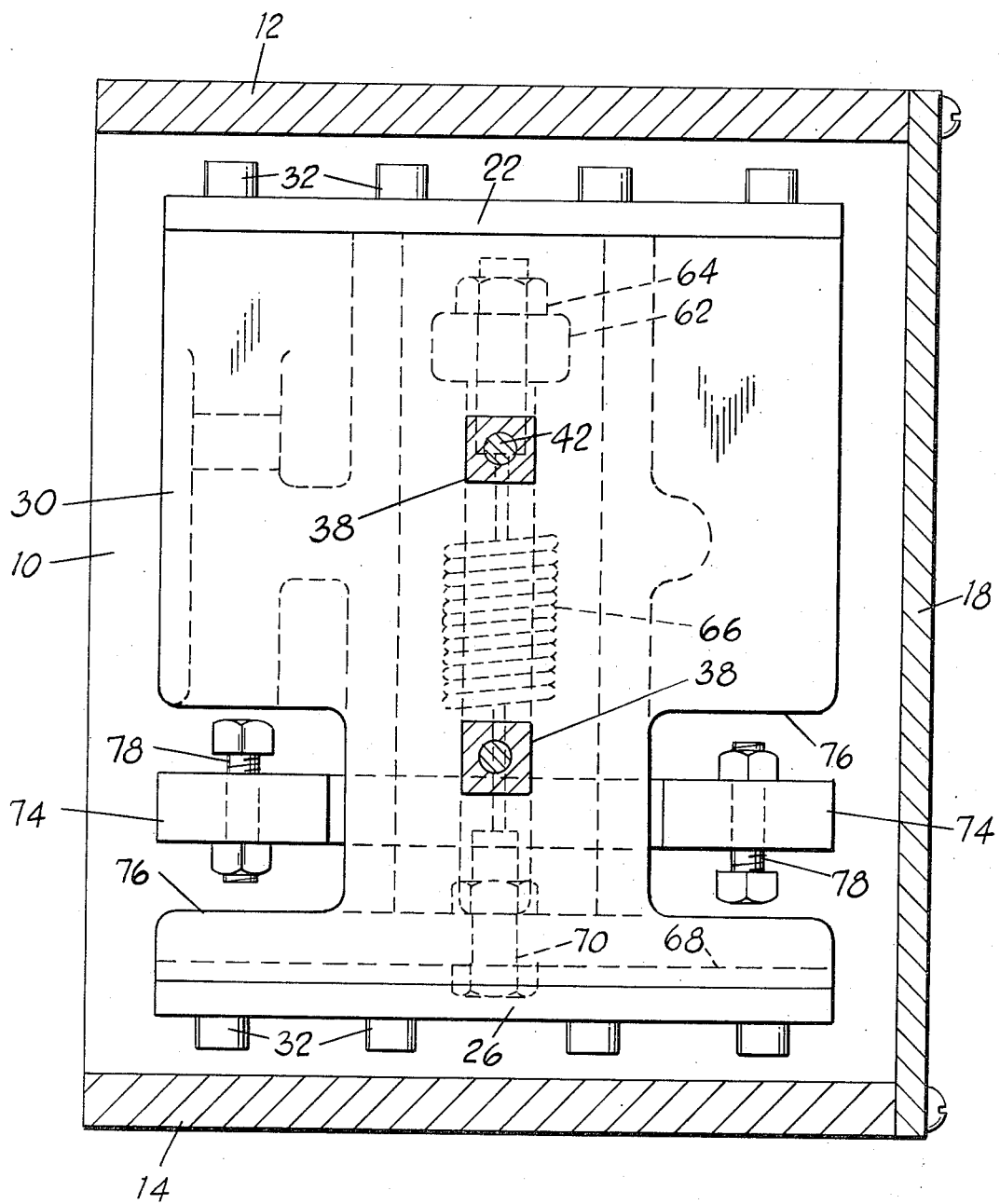
FIG. 3 is a vertical cross sectional view along the plane of the line 3—3 in FIG. 1.
Figure 4:
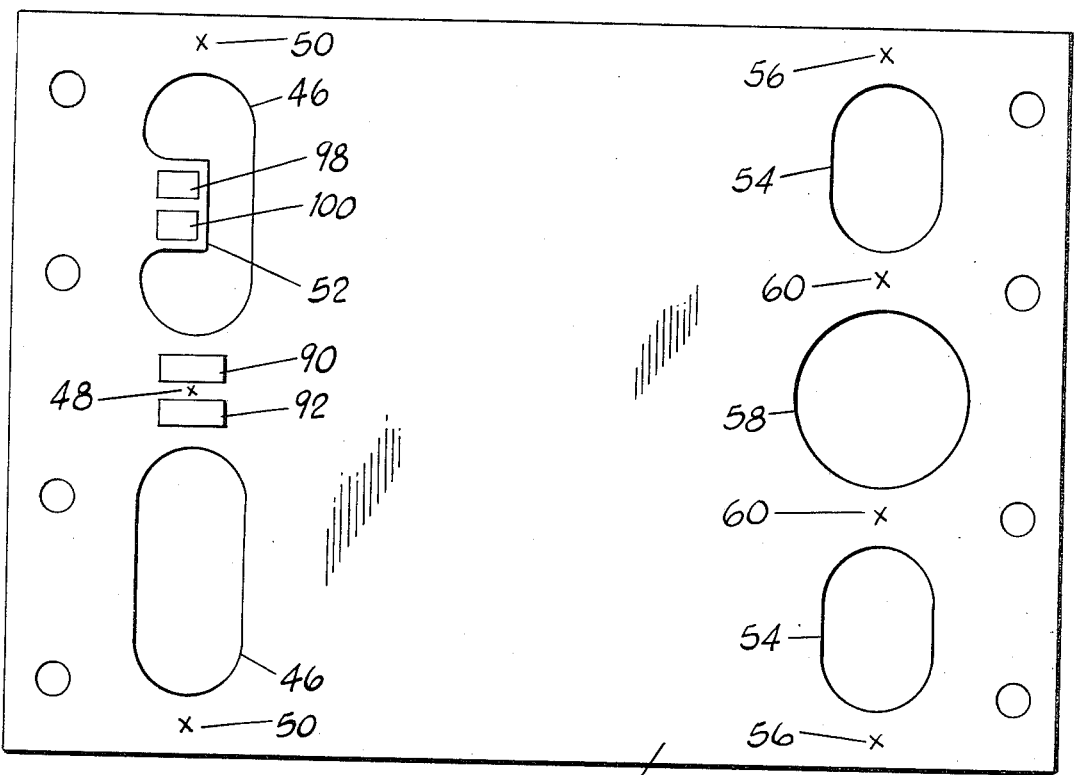
FIG. 4 is an enlarged top plan view of the upper bending plate of the scale.
Figure 5:
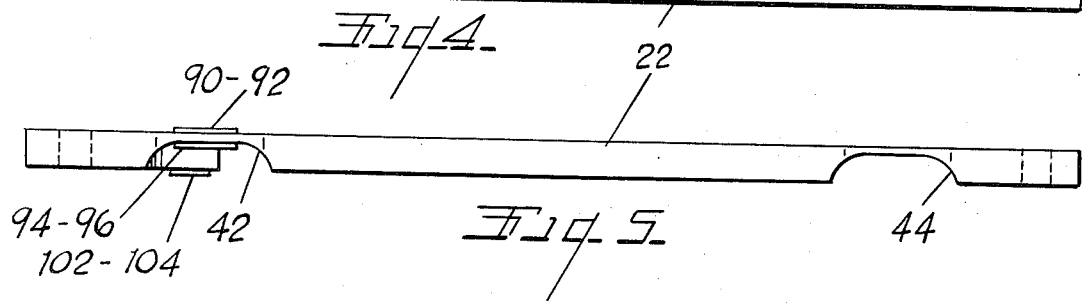
FIG. 5 is an edge elevational view of the plate.

Referring to the counter-balancing structure in FIGS. 1 – 3, a central upright rib 62 projects from the inner anchor plate 20 and carries an adjustable anchor 64 at its outer end for the upper end of a counter-balance coil spring 66. A flange 68 projects rigidly inwardly from the lower portion of the platform support plate 30 (See FIG. 1) and carries an adjustable screw connection 70 to the lower end of the spring 66. The spring thus supports the tare weight of the scale parts from the fixed rib 62. A platform or shelf 72 also projects horizontally from the plate 20 and has laterally spaced ears 74 which project into notches 76 in the side edges of the platform support plate. Adjustable movement limit bolts 78 carried by the ears coact with the edges of the notches to limit movement of the beams and weighing structure to a short distance of travel. The shelf 72 has a notch 80 on one side which passes the lower end of a dash-pot cylinder 82, the cylinder being supported on the shelf by mounting ears 84. The piston 86 of the dash-pot is connected to an arm 88 which projects rearwardly or inwardly from the platform support plate. The dash-pot dampens vibration of the movable parts of the scale as is common.

Figure 6:
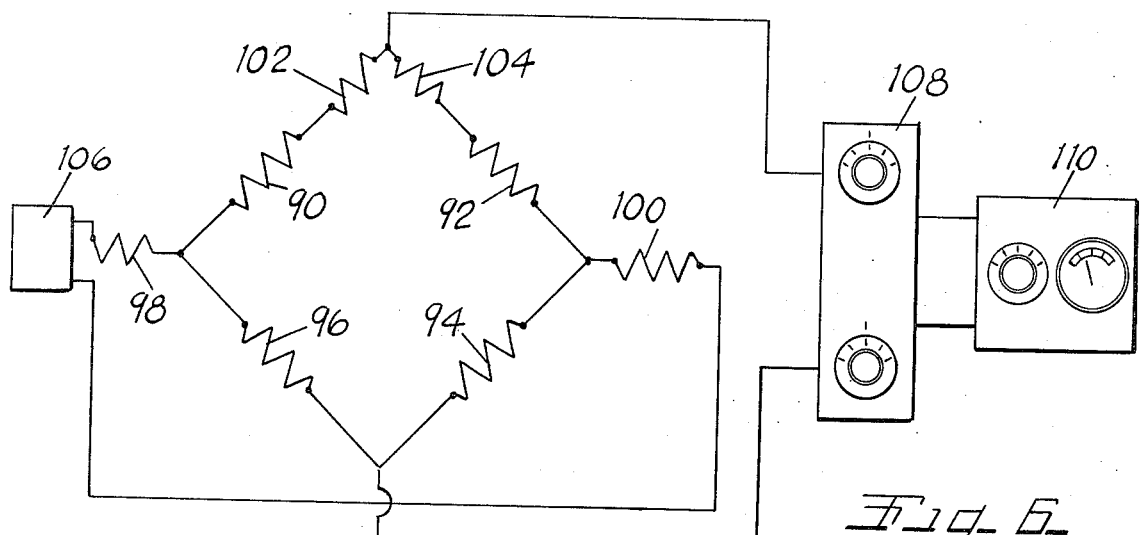
FIG. 6 is a schematic diagram of the electrical circuit containing the strain gauges of the scale.

The electrical connections and parts of the scale are shown more clearly by the circuit diagram in FIG. 6. Strain gauge elements 90 and 92, which are secured by adhesive to the top of the central inner bending area 48 of the upper beam, are connected in a Weatestone bridge with lower strain gauge elements 94 and 96 secured to the underside of the same bending area. The temperature responsive resistance elements 98, 100, 102 and 104, which are physically supported on the tab 54 are connected into the bridge circuit to compensate for temperature change of the scale and beam elements. Current fed from a regulator 106 excites the bridge, and the output is connected to a suitable amplifier 108 and indicator 110. By means of suitable known controls, the circuit and the counter-balance spring can be adjusted to produce a zero reading when the scale is empty. Any added weight stresses upper strain gauges 98 and 100 more and reduces the stress on the lower gauges 102 and 104 to produce a signal that is proportional to the added weight.

It will be noted that all of the measured or sensed strains are taken in the inner central sensing area 48 which is responsive only to applied loads. Any other strains resulting from eccentric application of the load are absorbed in the quadrilaterally spaced bending areas 50, 56 and 60 of the upper plate 22 and the corresponding areas of the lower plate 26.

FIGS. 7 – 8 illustrate a modified form of scale in which tare weight loads are counterbalanced by a mass, rather than a spring. The scale includes an upright anchor plate 220 having an upper beam plate 222 secured thereto by screws 224. A lower beam plate 226 is secured to its bottom by screws 228. The unsupported edges of the plates are secured together by the platform support plate 230 held in place by screws 232. The platform 234 is mounted on column 236 attached to the support plate by screws 242.

The plates have an inner area of reduced cross section 243 and an outer area of reduced cross section 244. The inner area has oval holes 246 formed therethrough leaving localized bending areas 248 in the center and 250 in laterally spaced relation on each side thereof. The outer edge of the plates have spaced holes 254 and a central hole 258 formed therethrough to produce laterally spaced side bending areas 256 and more closely spaced central bending areas 260.

The pan 234 and beam system are counterbalanced by a counterbalance beam 266 that is secured to the bottom of the lower beam plate 226 by screws 268 and projects inwardly below and beyond the anchor plate where it carries a mass counter-weight 269. The system is stabilized by suspension flexures attached to the lower beam plate and a strut 272 projecting outwardly from the anchor plate. A stiffening rib 273 connects the upper edge of the strut to the anchor plate. An outer suspension leaf 274 secured to the ear 275 on the lower beam by screws 276 projects downwardly through the central hole 258 in the lower plate and is attached to an ear 278 on the pan support plate by screws 280. Near the inner end of the lower beam plate, the counterbalance beam 266 is provided with laterally projecting ears 282 to which inner suspension flexures 284 are secured by screws 286. The flexures 284 project upwardly through the holes 246 and are attached by screws 288 to ears or flanges 290 on the strut 272. The inner suspension flexures are arranged in vertical crossing relation to the inner axis of bending which extends through the bending areas disposed across the outer end of the lower beam plate.

FIGS. 9 and 10 show an arrangement of the flat cantilevered beam plate for measuring the weight distribution within a work piece, by indicating the bending moment produced by the item when supported at a known distance from the fixed base of the scale. The scale is useful in calibrating precision items such as the rotor blades for a turbine engine, one of which is indicated by the dotted lines at B.

A fixed base or support plate 320 has a single flat beam plate 322 secured to its lower edge by screws 324. An article supporting jig or fixture 336 is secured along the free edge of the plate and has an angled hook or socket 334 shaped to receive and support the inner end of the blade B at a known and uniform distance from the base.

Disposed along a bending line parallel to the base 320 is a single relieved or cut-away area 342 which is further reduced by oval holes 346, leaving a central bending area 348 and two transversely spaced bending areas 350. A counter-weight beam 366 is secured to the bottom of the plate and has ears 382 projecting under the holes 346. Suspension or tension leaf springs 384 connect to the ears and project up through the holes to ears 391 on the base. An adjustable counter-weight is indicated at 369.

As in the first two forms of the scale, strain gauges 390, 392, 394 and 396 are secured to the top and bottom sides of the central bending area 348, and an ear 354 projecting into one of the holes 346 supports temperature compensating resistors 398, 400, 402 and 404. By connecting the strain gauges and resistors into a circuit like that shown in FIG. 6, a reading may be obtained which accurately reflects whether the distribution of the mass in the blade B is uniform or equal to a standard, or if it is heavier or lighter toward its tip, and by how much.

It is a common characteristic of all three forms of the balance that eccentric application of a load will not effect the accuracy of the scale. In FIGS. 9 & 10 a load applied to the pan in transversely off-set relation to the axis of the weighing beam will apply a transverse twist or axial torque to the beam. However, the forces and strains created by such a twist are resisted and absorbed entirely by the laterally spaced side bending areas, one being bent downwardly and the other upwardly. The central bending areas to which the strain gauges are applied lies along the central axis of the beam which does not experience any material torsional strain.

The laterally spaced, side bending areas not only carry a large portion of the purely vertical shear forces created by the tare weight and the applied load, as well as a large share of the pure bending load; they also act to strengthen and reinforce the beams against inadvertently applied shock loads from any direction, such as may be encountered from automatic load shifting and advancing mechanism. The scale is thus less susceptable to damage. While the central bending areas are subjected to some shear loading, this has no effect on the strain gauges, so the strain gauges react purely to bending forces and stresses that are accurately proportional to the mass of the applied load and which can accurately be read on the indicator.

The first two forms of the scale, with two parallel beam plates and further stabilizing structure, and also compensate for inaccurate location of the applied load longitudinally outwardly from the fixed ends or edges of the beam plates. The quadrilateral or three dimensional spacing of the several bending areas provide a parallelogram support for the pan and the load carrying element in two planes, so the pan and the load must move in a true vertical line. As previously noted, the inner bending areas such as 48 and 50 tend to and do bend down while the outer bending areas 60 bend up. For the application of any given load to the scale pan, the bending and stressing of the inner bending areas, and particularly the central bending area with the strain gauges thereon, will be the same regardless of whether the load is applied to the inner or outer edge of the scale pan. The increase in bending moment that would tend to tilt the load support element and the pan outwardly is resisted by relative increased tension in the upper bending areas and increased compression in lower bending areas. However, since the strain gauges are located on the top and bottom of only one of the bending areas, they are stressed equally by either pure tension or compression and do not create or produce any indication on the meter or recording mechanisim of the scale. This further points out that the illustrated location of the strain gauges on the upper, inner edge of the plate beam assembly is not critical. So long as they are located in the transverse center of the beam system and on one of the vertically quadrilaterally spaced bending areas, an accurate reading or indication of the mass of the weight applied to the scale can be obtained.

Neither is it necessary to all forms of the scale or balance that the bending areas all be disposed in horizontal planes. Vertical flexing areas such as are included in the cross-flexure points in FIGS. 9 and 10 may be employed, either alone or in combination as a part of a cross-flexure point.

Numerous variations of the disclosed scales can thus be devised without departing from the theory of the scale as defined in the following claims.

What is claimed as new is:

1. A weighing scale in which a load applied to the free end of a first beam creates a bending stress near a fixed end of the beam and the magnitude of the load and bending stress is sensed and measured by stress sensitive gauges applied to the bending area of the beam, characterized by:
   A. said beam being widened relative to its thickness and having an interrupted transversely extending line of minimum thickness defining at least three spaced bending sections with a central bending section and two transversely spaced bending sections located adjacent the transverse edges of the beam,
   B. said stress sensitive gauges being adhered to the top and bottom of said central bending section,
   C. a load supporting element rigidly secured to the longitudinally outer end of said beam,
   D. and means connected between said load supporting element and the fixed end of said beam counterbalancing the tare weight of said beam outwardly from said bending areas and the parts connected thereto.

2. A scale as defined in claim 1 in which said load supporting element is guided in vertical upright position by a second plate-like beam arranged in vertically spaced parallel relation to said first beam,
   said second beam having central and transversely spaced side bending areas arranged along a line near its inner anchored edge similar to said first beam.

3. A scale as defined in claim 2 in which said counterbalancing means comprises:
   E. a strut projecting fixedly between said first and second beams,
   F. an ear projecting inwardly from said load supporting element in spaced relation to said strut,
   G. and a coil spring connected between said strut and said ear.

4. A scale as defined in claim 3 in which said strut is above said ear and said spring is in tension.

5. A scale as defined in claim 1 in which said counterbalancing means comprises:
   H. a counter-balance beam connected to said first beam between the load supporting element and the bending areas of the first beam, the counterbalance beam projecting oppositely from the first beam to the opposite side of the fixed end of the first beam,
   I. and a counter-balance mass on the oppositely projecting end of the counterbalance beam.

6. A scale as defined in claim 1 in which said beam has:
   J. a second interrupted line of minimum thickness located in outwardly spaced relation from said first line adjacent said load supporting element,
   K. said second line defining at least two transversely spaced bending sections located symmetrically on opposite sides of the longitudinal axis of the beam and adjacent the side edges thereof.

7. A scale as defined in claim 2 in which each of said first and second beams has:
   J. a second interrupted line of minimum thickness located in outwardly spaced relation from said first line adjacent said load supporting element,
   K. said second line defining at least two transversely spaced bending sections located symmetrically on opposite sides of the longitudinal axis of the beam and adjacent the side edges thereof.

8. A strainweigh scale comprising:
   A. a fixed support,
   B. a relatively rigid load receiving member, C. means swingably supporting said load receiving member from said support including
- C-1. a plate member having one end fixedly connected to said fixed support and having three spaced relatively bendable flexing elements formed therein and arranged along a horizontal line adjacent and parallel to said fixed support,
- C-2. said plate member having its other end fixedly connected to said load receiving member and transversely arranged relative to the axis of said load receiving member, D. counter-balance means connected to said load receiving member and biasing it to the unflexed position of said flexing elements, E. and four strain gauges adhered in pairs to the opposite sides of the middle one of said flexing elements.

9. A scale as defined in claim 8 in which said flexible elements are generally horizontal in the counterbalanced condition of the scale.

10. A scale as defined in claim 8 in which said counterbalance means is a rigid beam connected to said load receiving member and extending to the opposite side of the line of said flexing elements from the load receiving member.

11. A scale as defined in claim 8 which further includes:
- F. a rigid arm disposed in vertically spaced parallel relation to said plate member and connected at one end to said fixed support,
- G. at least two additional inner flexing elements formed in said rigid arm along a horizontal line and transversely symmetrically located relative to the first flexing elements,
  - G-1. said rigid arm being connected at its other end to said load receiving member,
- H. and a plurality of outer flexing elements formed in said plate member and said rigid arm in parallel relation to the lines of said inner three flexing elements and said additional flexing elements,
- I said outer flexing elements being symmetrically located relative to a plane through said load receiving member and said rigid arm and the center one of said first three flexing elements.

12. A scale as defined in claim 11 in which the flexing elements at the inner and outer ends of said plate member and said rigid arm include generally horizontally disposed and extending and vertically flexible elements.

13. A scale as defined in claim 12 in which there is:
- J. A load pan secured to said load receiving member.

14. A scale as defined in claim 12 in which said outer flexing elements include at least two upper and two lower elements arranged in symmetrically spaced relation on opposite sides of the plane of said load receiving member and said rigid arm.

15. A scale as defined in claim 13 in which all of said flexing elements are formed by shaping said plate member and said rigid arm to provide flexing areas of reduced cross section.

16. A strainweigh scale comprising
- A. a vertically extending support,
- B. upper and lower arms extending parallel and laterally from said support,
- C. an upright connecting the outer ends of said arms,
- D. flexing elements connecting said support, said arms and said upright in a vertically disposed rectangle,
  - D-1. the flexing elements at at least one corner of said rectangle adjacent said support being disposed along a horizontal line with one central element and transversely and symmetrically spaced elements on each side,
  - D-2. said central element being vertically flexible and resistant to horizontally applied stress,
- E. strain gauges secured in pairs to the upper and lower sides of said central element,
- F. and means counter-balancing said rectangularly arranged parts to a neutral position of said central flexing element.

* * * * *